US012568185B2

(12) United States Patent
Kendall et al.

(10) Patent No.: US 12,568,185 B2
(45) Date of Patent: * Mar. 3, 2026

(54) CAPTION ENCODER SYSTEM AND METHOD

(71) Applicant: DAVINCIA, LLC, Branson, MO (US)

(72) Inventors: David Kendall, Branson, MO (US); Eddie R. Dry, Branson, MO (US)

(73) Assignee: DAVINCIA, LLC, Branson, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/799,380

(22) Filed: Aug. 9, 2024

(65) Prior Publication Data

US 2024/0406345 A1 Dec. 5, 2024

Related U.S. Application Data

(63) Continuation of application No. 17/969,145, filed on Oct. 19, 2022, now Pat. No. 12,120,454.

(60) Provisional application No. 63/257,626, filed on Oct. 20, 2021.

(51) Int. Cl.
*H04N 7/08* (2006.01)
(52) U.S. Cl.
CPC .................................... *H04N 7/08* (2013.01)
(58) Field of Classification Search
None
See application file for complete search history.

(56) References Cited

U.S. PATENT DOCUMENTS

| | | | |
|---|---|---|---|
| 7,607,005 B1 | 10/2009 | Lewis | |
| 2002/0015106 A1 | 2/2002 | Taylor, Jr. | |
| 2003/0169366 A1* | 9/2003 | Lenzi ...................... H04N 7/10 348/461 |
| 2004/0133910 A1 | 7/2004 | Gordon et al. | |
| 2008/0249759 A1 | 10/2008 | Trumble et al. | |
| 2010/0128800 A1 | 5/2010 | He et al. | |
| 2011/0164673 A1 | 7/2011 | Shaffer | |
| 2013/0173838 A1* | 7/2013 | Hsu ..................... G06F 13/4027 710/315 |
| 2019/0089951 A1* | 3/2019 | Jones ................. H04N 21/4884 |

OTHER PUBLICATIONS

Written Opinion of the International Searching Authority dated Mar. 10, 2023.

* cited by examiner

*Primary Examiner* — Omar S Parra
(74) *Attorney, Agent, or Firm* — Jacob M. Ward; Ward Law Office LLC

(57) ABSTRACT

A caption encoder system is provided that can include a computer system and a caption encoder card. The caption encoder card can include a caption encoder module having at least one of: an input component, a field programmable gate array (FPGA), a microcontroller unit (MCU), a peripheral component interconnect express (PCIe) bridge, and a plurality of output components. The input component can be configured to receive an input SDI stream. The FPGA can be in communication with the input component and can be configured to compile an output SDI stream with embedded closed captions. The MCU can be in communication with the FPGA. The PCIe bridge can be in communication with the microcontroller unit and a plurality of universal serial bus to serial devices. The plurality of output components can be communication with the field programmable gate array.

17 Claims, 7 Drawing Sheets

FIG. 1        100
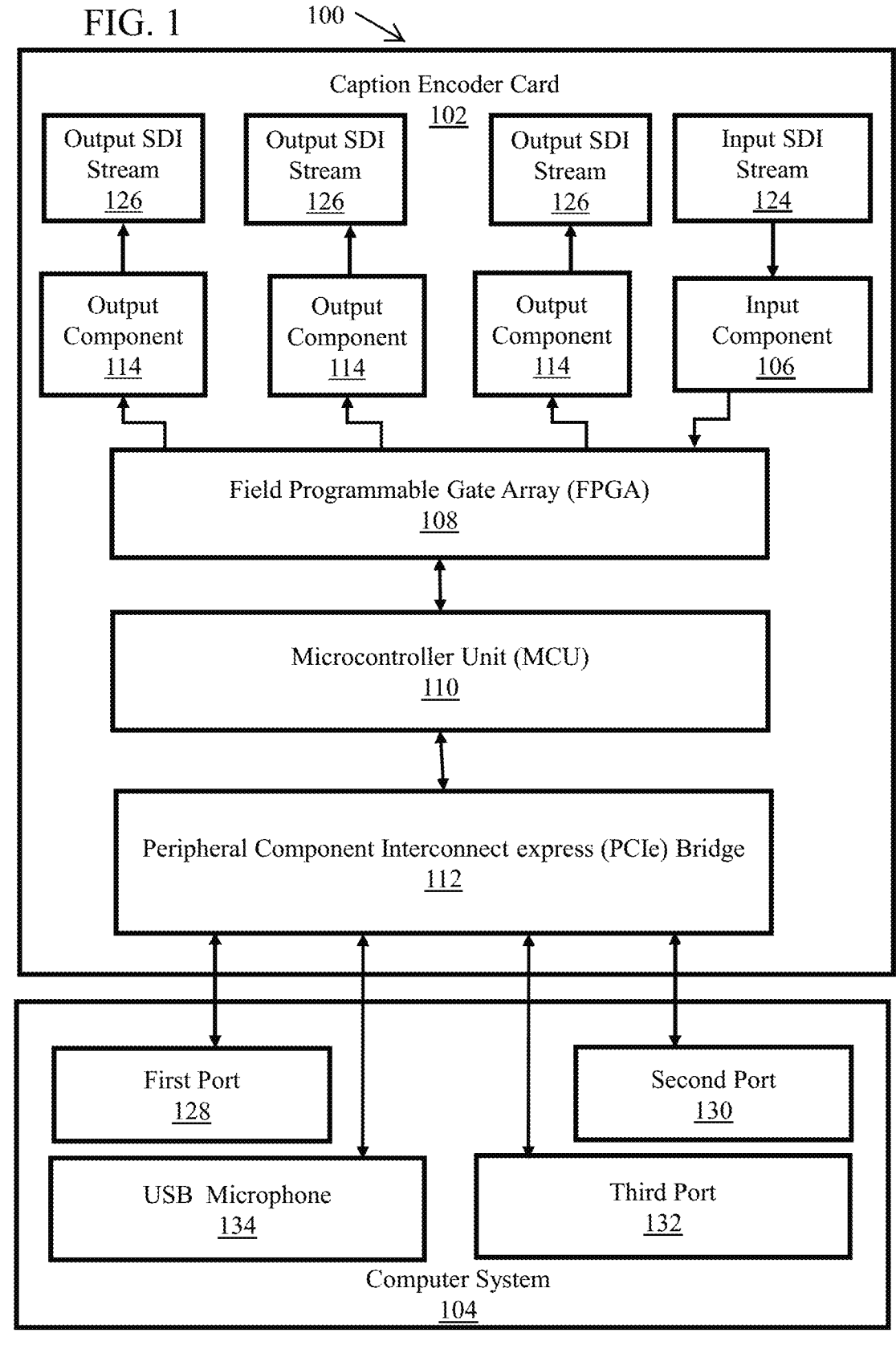

200

CAPTION ENCODER SYSTEM AND METHOD

CROSS-REFERENCE TO RELATED APPLICATIONS

This application is a continuation of U.S. patent application Ser. No. 17/969,145, filed on Oct. 19, 2022, which claims the benefit of U.S. Provisional Application No. 63/257,626, filed on Oct. 20, 2021. The entire disclosures of the above applications are incorporated herein by reference.

FIELD

The present technology relates to captioning devices and, more specifically, to an improved closed captioning device.

INTRODUCTION

This section provides background information related to the present disclosure which is not necessarily prior art.

Closed captioning systems and methods are used to display text on a television or video screen, which text typically includes a transcription of the audio portion of a program as it is being viewed. Closed captioning may thus be used by various persons, including the deaf and hard of hearing, to allow better enjoyment and comprehension of the program. Uses of closed captioning can further include assistance with learning a new language and improvement of content comprehension in noisy environments.

In some situations, video content providers can require a separate rack mounted caption encoding appliance for each individual channel being provided. Many video content provider operations simultaneously transmit multiple captioned programs. An example is a state or local government entity that broadcasts meetings from multiple hearing rooms at one time. In many video content provider operations, physical rack space for caption encoding appliances is very limited.

Additionally, certain caption encoding appliances require communication with a network in order to operate. This can lead to various issues in the captioning process. For example, any latency in the network can result in a lag in the captioning process. This is undesirable during live broadcasts. Further, communications with the network can leave the computer system of the captioner vulnerable to outside security threats.

Accordingly, there is a continuing need for an improved caption encoder system.

SUMMARY

In concordance with the instant disclosure, an improved caption encoder system, has surprisingly been discovered.

In the present disclosure, a caption encoder system is provided that can include a computer system and a caption encoder card. The caption encoder card can include an input component, a field programmable gate array (FPGA), a microcontroller unit (MCU), a peripheral component interconnect express (PCIe) bridge, and a plurality of output components. The input component can be configured to receive an input serial digital interface (SDI) stream. The FPGA can be in communication with the input component and can be configured to compile an output SDI stream with embedded closed captions. The MCU can be in communication with the FPGA. The PCIe bridge can be in communication with the microcontroller unit and a plurality of universal serial bus to serial devices. The plurality of output components can be in communication with the FPGA.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a caption encoder system;

DETAILED DESCRIPTION

Figure 2A:
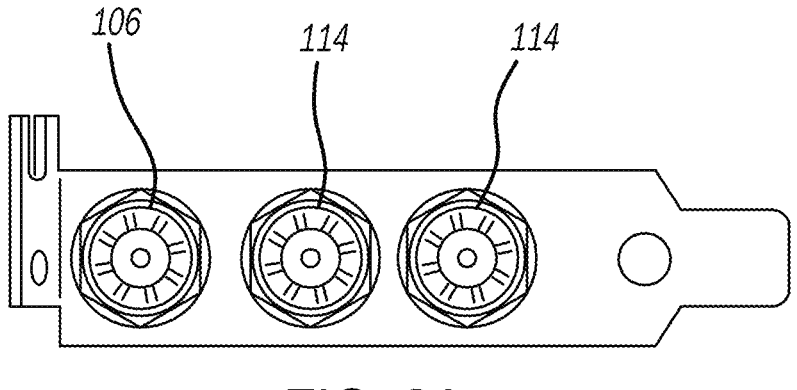
FIG. 2A is a front elevational view of a caption encoder card with a low profile PCIe card.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure provides a caption encoder system 100. The caption encoder system 100 can include a caption encoder card 102. The caption encoder card 102 can be configured to be integrated into a computer system 104 of a captioner, for example, through a bus of the computer system 104. As a non-limiting example, the captioner can be a user or voice recognition software. As a non-limiting example, the caption encoder card 102 can be a three gigabit level B, high definition, or standard definition serial digital interface closed caption Peripheral Component Interconnect Express (PCIe) encoder card. The caption encoder card 102 can include at least one input component 106, a field programmable gate array (FPGA) 108, a microcontroller unit (MCU) 110, a peripheral component interconnect express bridge (PCIe) 112, and a plurality of output components 114. In certain embodiments, the FPGA, MCU, and PCIe bridge can be separate components. In other embodiments, the MCU and PCIe bridge can be a part of the FPGA.

Figure 3A:
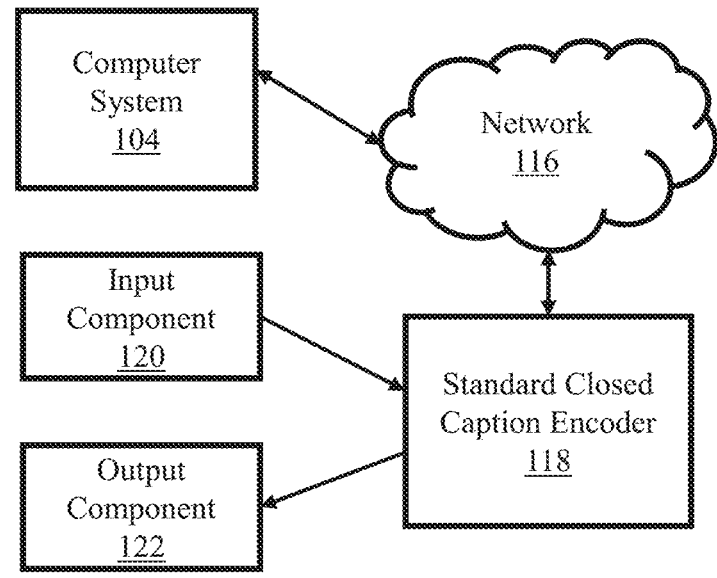
FIGS. 3A and 3B are schematic diagrams depicting caption encoder systems of the prior art in comparison to the caption encoder system of the present disclosure.
Figure 3B:
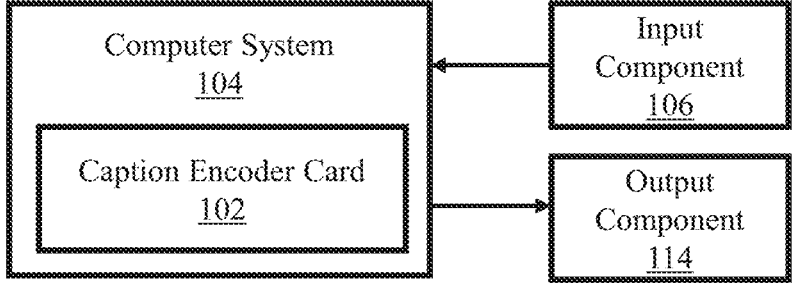

Further, the integration of the caption encoder card 102 can allow for a more streamlined captioning process over certain other captioning methods, for example, as shown by comparison of FIGS. 3A and 3B. For example, the prior art shown in FIG. 3A requires a network 116 or network connection between the computer system 104 of the captioner and the standard caption encoder 118 of the prior art and the input component 120 and output component 122 of the caption encoder 118. However, the caption encoder system 100 of the present disclosure can operate within the computer system 104 of the captioner, which can reduce the need for a network or internet connection, as shown in FIG. 3B. Advantageously, this can allow the caption encoder system 100 to continue to operate in situations where internet capabilities are diminished. Further, the computer system 104 having the caption encoder card 102 of the present disclosure can directly receive certain serial digital input (SDI) streams 124 from the input component 106 and can process and output the captioned video streams without further communication with third-party devices. Additionally, and desirably, the integration of the caption encoder system 100 can greatly reduce an amount of space utilized by the computer system 104 of the captioner since the caption encoder card 102 can be housed within the computer system 104, for example, as shown in FIG. 3B.

Figure 4A:
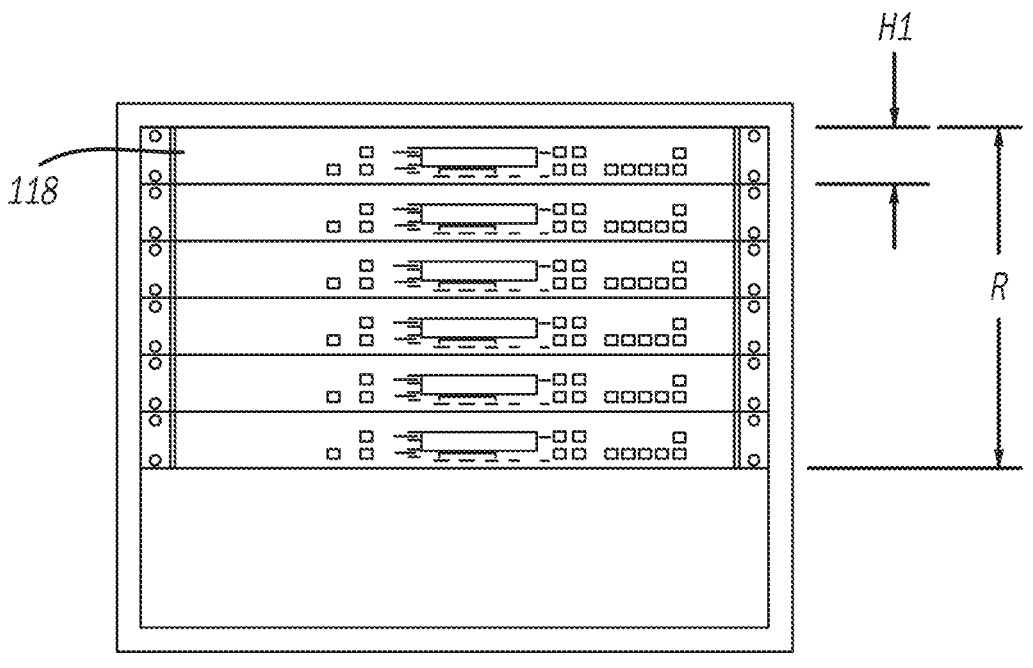
FIGS. 4A and 4B are front elevational views depicting the rack space required to house the caption encoder system of the prior art in comparison to the caption encoder system of the present disclosure.
Figures 5A, 5B:
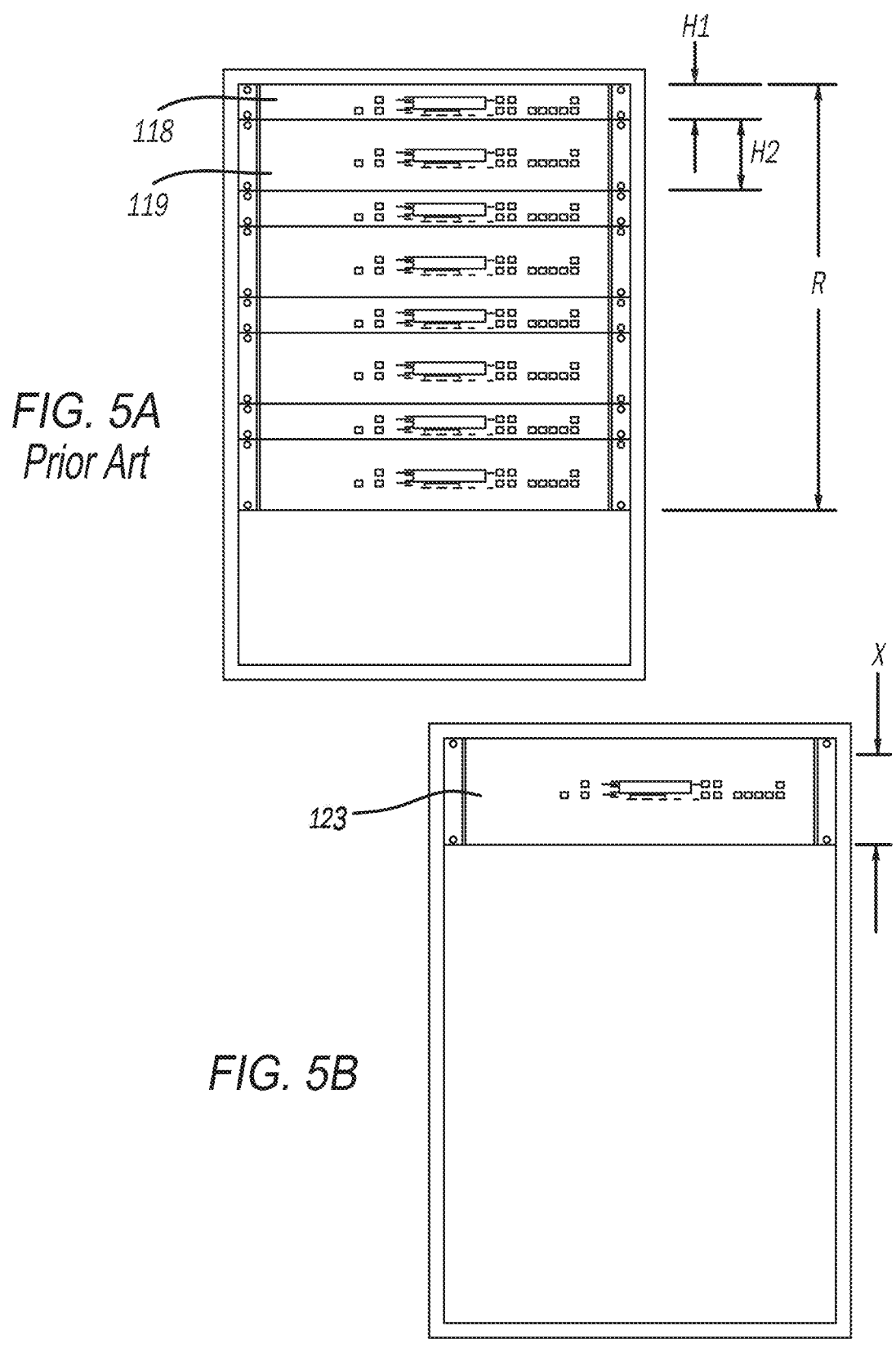
FIGS. 5A and 5B are front elevational views depicting the rack space required to house the caption encoder system of the prior art in comparison to the caption encoder system of the present disclosure.

Turning now to FIGS. 4A and 5A, storage of the caption encoder systems of the prior art that require rack space for each individual caption encoder system are illustrated. For example, FIG. 4A illustrates six different one-rack standard closed captioning encoders 118 that take up a corresponding six rack spaces. Similarly, FIG. 5A illustrates four transcription services consisting of a one-rack standard close captioning unit 118 and a two-rack standard close captioning unit 119. The four transcription services, each with a one-rack standard close captioning unit 118 and a two-rack standard close captioning unit 119 total twelve rack spaces. Each one-rack standard closed captioning encoder can occupy one rack space with a first height (H1). Similarly, each two-rack standard closed captioning encoder can occupy two rack spaces with a second height (H2). As a non-limiting example, the second height (H2) can be about double the first height (H1), shown in FIG. 5A. Further, the combined height of each standard closed captioning unit 118,119 can be added to determine the rack height (R) required to house the standard closed captioning units 118, 119.

Figure 4B:
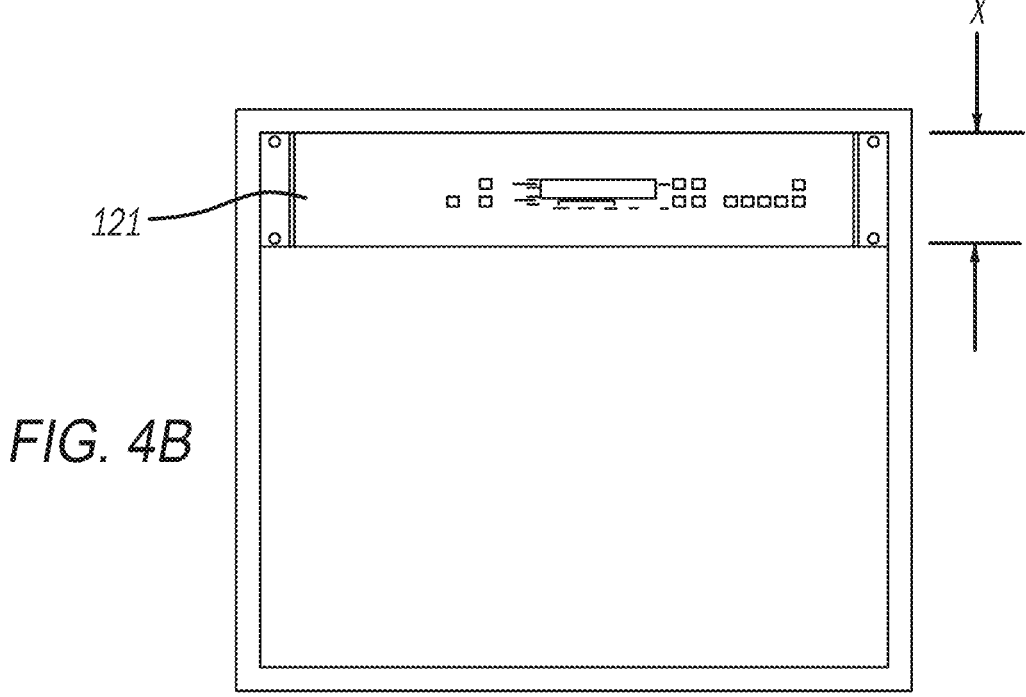

Conversely, FIGS. 4B and 5B illustrate the caption encoder system of the present disclosure wherein the caption encoder system 100 can greatly reduce an amount of space or unit height (X) utilized by the computer system 104 of the captioner, as the caption encoder card 102 can be housed within the computer system 104. For example, as opposed to the six rack spaces used in FIG. 4A, the caption encoder system 100 of the present disclosure shown in FIG. 4B illustrates a single two-rack unit 121 with six caption encoder cards 102. Further, as opposed to the twelve rack spaces used in FIG. 5A, the caption encoder system 100 of the present disclosure shown in FIG. 5B illustrates a caption encoder system 100 consisting of a three-rack unit 123. Each unit of the three-rack unit 123 can include four caption encoder cards 102 to provide the same total number of caption encoder cards 102 as FIG. 5A to occupy a unit height (X) of three rack spaces and, therefore, save nine rack spaces. As such, in a preferred embodiment, the unit height (X) of the caption encoder system 100 can be less than half of the rack height (R) required to house the standard closed captioning units 118,119. In a more preferred embodiment, the unit height (X) of the caption encoder system 100 can be less than a third of the rack height (R) required to house the standard closed captioning units 118,119.

It should be further appreciated that, as described above and illustrated in FIGS. 4B and 5B, multiple caption encoder cards 102 can be integrated into a single computer system 104. Advantageously, this can allow the computer system 104 to be used across multiple broadcasts at one time, for example, a state government that is broadcasting meetings from multiple hearing rooms at one time. The caption encoder system 100 can allow for multiple channels to be simultaneously broadcast. In certain embodiments, up to eight channels can be simultaneously broadcast from one caption encoder system 100.

Additionally, the caption encoder system 100 of the present disclosure can provide a spare redundancy in the case where one of the encoder cards 102 experiences a failure. The ability of the caption encoder system 100 to simultaneously broadcast multiple channels can provide an open channel that can be utilized if another encoder card 102 fails. Should one of the encoder cards 102 experience a failure, the system 100 can be configured to divert the broadcast to an open encoder card 102.

Figure 2B:
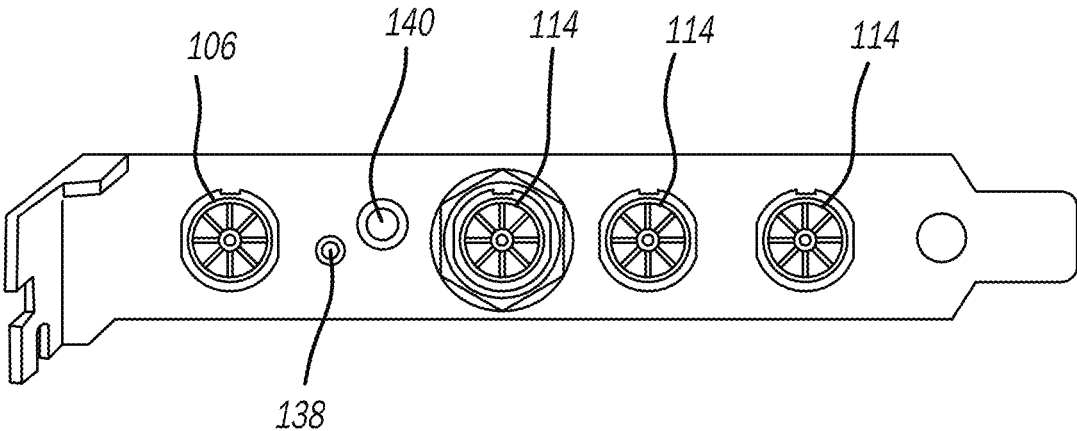
FIG. 2B is a front elevational view of the caption encoder card with a full height PCIe card.

With reference again to FIGS. 1-2, the caption encoder card 102 can include at least one input component 106. The input component 106 can be configured to receive an input SDI stream 124 with audio. Further, the input component 106 can be configured to accept 3G/HD/SD-SDI transport SDI streams. Each of the input components 106 can be SDI connections. One of ordinary skill can select a suitable number of input components 106 within the scope of the present disclosure.

The caption encoder card 102 can include a plurality of output components 114. Each of the plurality of output components 114 can be in communication with the FPGA 108. Each of the plurality of output components 114 can be an SDI output 126. The number of output components 114 can be adjusted based on a desired profile of the caption encoder card 102, which can be determined by the particular computer system 104 in which the caption encoder card 102 is integrated. The SDI output 126 can be re-clocked, making the SDI output eye pattern generally better than the input. The caption encoder system 100 can pass ancillary data including audio untouched to each of the plurality of output components 114. Each of the plurality of output components 114 can provide an output SDI stream 126 of caption encoded output of the same format as the input SDI stream 124. The output SDI stream 126 can be a video with embedded closed captions.

It should be appreciated that the term "encode" as used within the present disclosure can mean to put the captions within the SDI stream such that a viewer can choose to turn on closed caption or a viewer can choose to turn off closed captions. The term "decode" as used within the present disclosure can mean to burn the captions into the video. Optionally, each of the plurality of output components 114 can provide an output SDI stream 126 that is decoded. Where the output SDI stream 126 is encoded, the output SDI stream 126 can contain embedded closed captions. Where the output SDI stream 126 is decoded, the output SDI stream 126 can contain captioning burnt into the output video. Advantageously, the use of the plurality of output components 114 can allow for built-in redundancy of the caption encoder card 102. One of ordinary skill can select a suitable number of output components 114 within the scope of the present disclosure.

With reference to FIG. 1, the caption encoder card 102 can include a plurality of modules 108, 110, 112 configured to receive and process the input SDI streams 124 from the input component 106 and send the output SDI streams 126 to the plurality of output components 114. The modules can include a Field Programmable Gate Array (FPGA) 108, a Microcontroller unit (MCU) 110, and a Peripheral Component Interconnect express (PCIe) Bridge 112, for example, as shown in FIG. 1. Though the modules 108, 110, 112 are depicted as separate components in FIG. 1, it should be appreciated that the modules 108, 110, 112 can be provided as a single component configured to perform multiple functions as described herein.

The FPGA 108 can be in communication with the input component 106 and configured to compile an output SDI stream 126. The FPGA 108 can receive the input SDI stream 124, extract audio data and closed caption data from the input SDI stream 124, and send the audio data and the closed caption data to the MCU 110. The audio data can be monitored by software or by a person transcribing. The FPGA 108 can also burn captions onto video from data received from the MCU 110. The MCU 110 can be in communication with the PCIe Bridge 112 and can send the audio data to the PCIe Bridge 112. The MCU 110 can decode the closed caption data from the FPGA 108 and send the decoded data back to the FPGA 108. The PCIe Bridge 112 can receive the audio data from the MCU 110.

The PCIe Bridge 112 can have three internal USB to serial ports 128, 130, 132, which can be in communication with additional devices and software on the computer system 104 of the captioner as well as the MCU 110. A first port 128, shown in FIG. 1, can allow the captioner to control the caption encoder card 102 through software by making changes in the encoder and decoder settings and output settings. With continued reference to FIG. 1, a second port 130 and a third port 132 can be used for transferring at least one of caption data and text, for example, by software or by the captioner. The use of second port 130 and the third port 132 can allow for simultaneous multilanguage captioning. The PCIe Bridge 112 can be in further communication with the MCU wherein the MCU can simulate a USB microphone 134 of the computer system 104 of the captioner. This can allow the captioner to listen to the audio to allow for a manual captioning process or allow software to transmit that audio elsewhere for speech recognition. It should be appreciated that the first port, the second port, and the third port do not denote a specific order or location of the ports.

Figure 6:
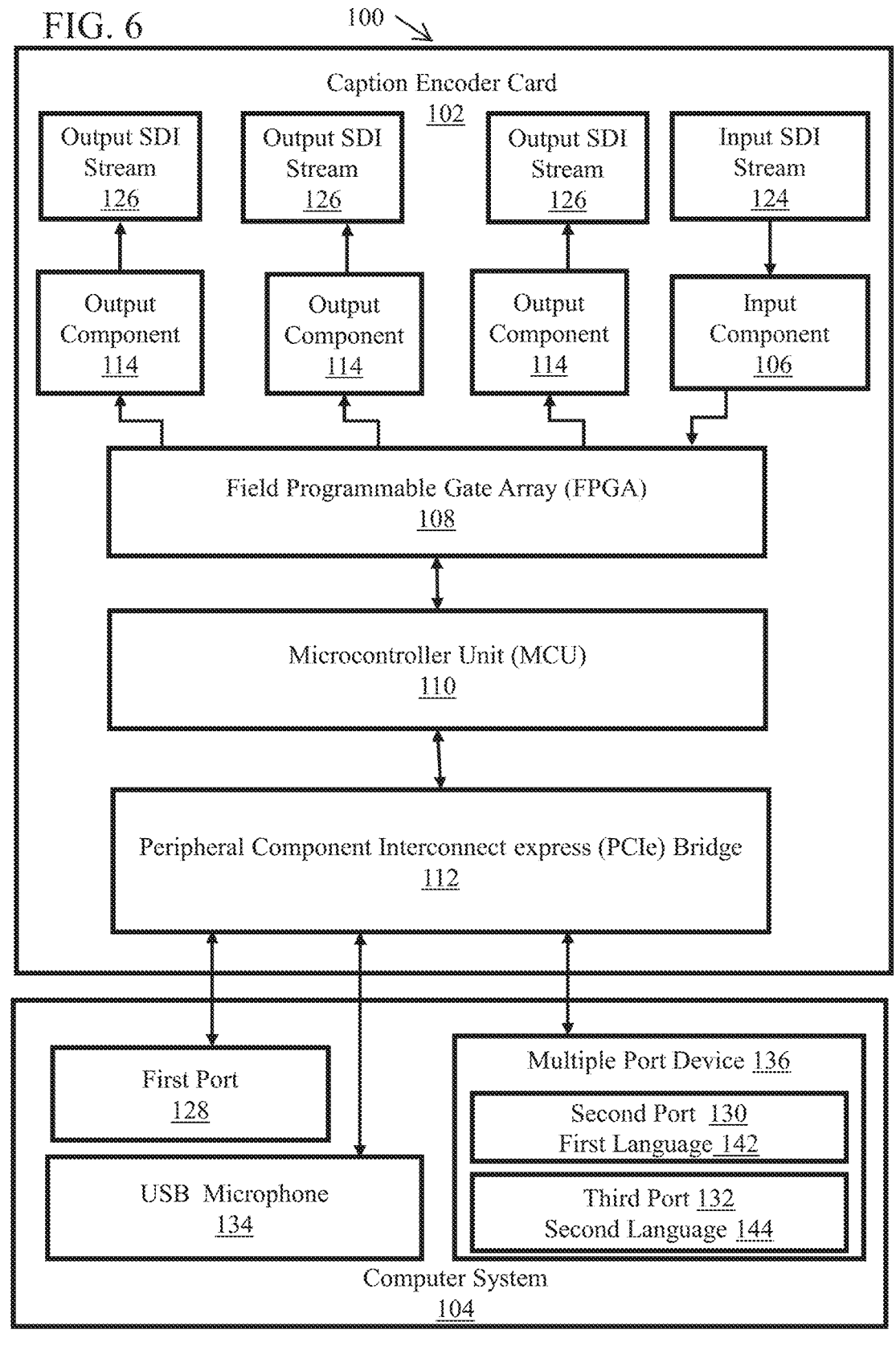
FIG. 6 is a schematic depiction of a caption encoder card with a multiple USB to serial device.

With reference now to FIG. 6, certain embodiments include a multiple port USB to serial device 136 that can allow for two different captioners (via caption software or transcription software, as non-limiting examples) to be connected to the encoder card 102 at the same time. Therefore, the second port 130 can be configured to receive caption data in a first language 142 and the third port 132 can be configured to receive caption data in a second language 144. The first language and the second language can be any language. Accordingly, in one non-limiting example, one captioner can be connected to one serial device for English captions and another captioner can be connected to the other serial device for Spanish captions. Alternatively, both captioners can be connected at the same time, and allow for one captioner to replace the other captioner, as needed. The multiple port USB to serial device 136 is not just an input. Data from one serial device can be sent out the other serial device, or data from pre-existing captions on the video can be sent out. This data can be sent to another device or can be used to create a caption file.

The closed caption data as processed by the PCIe Bridge 112 can be sent to the MCU 110. The MCU 110 can send the caption data to the FPGA 108. The FPGA 108 can embed the caption data onto the video SDI stream to form the output SDI stream 126. The FPGA 108 can then send the output SDI stream 126 to the necessary output component 114. The FPGA 108 can burn the caption data onto the video SDI stream, as desired.

In certain embodiments, the caption encoder card 102 can further include additional features. For example, the caption encoder card 102 can include an indicator light, which can be used to indicate when the input component 106 is receiving a signal. The caption encoder card 102 can also include an LED 138 and a GPI remote 140, shown in FIG. 2B.

In certain embodiments, the caption encoder card 102 can encode line 21/22 CTA-608 waveform and/or can encode SMPTE 334 Caption Distribution Packet (CDP) for SD. The CDP can contain a header, CTA-608 data, CTA-708 data, caption service descriptor, and a footer. For HD, it can encode the caption distribution packet. The caption encoder card 102 can have Random Access Memory (RAM) that is reserved for Extended Data Services (XDS) packets, the packets can be inserted into CEA-608 field 2 based on XDS packet priority and field 2 availabilities. The caption encoder card 102 can also have XDS menus for Parental Guidelines (V-Chip) and Transmission Station Identification (TSID) packets. The RAM can be filled using V-Chip software.

It should be appreciated that the caption encoder card 102 can allow the user to view information pertaining to, for example, the activity of each serial port and the audio and the status of the XDS, the GPI 140, and the input. Information pertaining to the mode and port of the encoders, serial ports of the encoder system, as well as the version of FPGA, MCU, and bootloader being utilized by the system can be identified. One of ordinary skill can select other information relevant to the operations of the encoder system valuable to the user that can be displayed within the scope of the present disclosure.

Further, the caption encoder card 102 can be upgraded by the user, including updates to the firmware and the software. The firmware updates can be software updates for the hardware. The software updates can be installed on the operating system of the computer system on which the encoder card is installed. The software can allow the operating system to communicate with the firmware on the encoder card for setup purposes. It should be appreciated that the caption encoder card 102 can be "field upgradable," which means that the user can update the software and the firmware, as needed, without having to have the caption encoder card 102 serviced at a separate location for updates.

The software can allow the user to change several settings within the caption encoder system 100. For example, the user can change encoder settings, caption settings, decoder settings, audio settings, XDS settings, and miscellaneous settings. The caption encoder system 100 can also select to use factor default settings or user default settings, as well as maintenance features. The encoder settings can include the ability to alter a first field encoder and a second field encoder, a first service transcoder and language, and a second transcoder and language. Further, the encoder settings can allow for commands to be ignored or bypassed. One of ordinary skill can select other suitable encoder settings that can be altered by the user within the scope of the present disclosure.

The caption settings can be altered by the user. As a non-limiting example, the caption settings can include selecting a CDP insertion line and the SD encoding mode. The user can also select to turn on/off the CDP descriptors. One of ordinary skill can select other suitable caption settings that can be altered by the user within the scope of the present disclosure.

Further, the decoder settings can be altered by the user. As a non-limiting example, the decoder settings can include selecting a decoder output component as well as data recovery. The user can further select font features such as italics, underlining, and bold. The user can also select the color and opacity of the foreground, the background, and the window. One of ordinary skill can select other suitable decoder settings that can be altered by the user within the scope of the present disclosure.

Additionally, the audio settings can be altered by the user. The use can alter the channel selected, change the multiplexing, and the volume of the audio. One of ordinary skill can select other suitable audio settings that can be altered by the user within the scope of the present disclosure.

Advantageously, the caption encoder system 100 of the present disclosure can be configured to be integrated into the computer system 104 of the captioner. The integration can allow for a more streamlined captioning process, along with a reduction in physical space occupied by the caption encoder system.

In certain embodiments, the computer system 104 can be communicatively coupled to one or more remote platforms. The communicative coupling can include communicative coupling through a networked environment. The networked environment can be a radio access network, such as LTE or 5G, a local area network (LAN), a wide area network (WAN) such as the Internet, or wireless LAN (WLAN), for example. It will be appreciated that this is not intended to be limiting, and that the scope of this disclosure includes implementations in which one or more computing platforms and remote platforms can be operatively linked via some other communication coupling. Although a network connection is not necessary, the one or more computing platforms can be configured to communicate with the networked environment via wireless or wired connections. In addition, in an embodiment, the one or more computing platforms can be configured to communicate directly with each other via wireless or wired connections. Examples of one or more computing platforms can include, but are not limited to, smartphones, wearable devices, tablets, laptop computers, desktop computers, Internet of Things (IoT) device, or other mobile or stationary devices. In certain embodiments, a system can be provided that can also include one or more hosts or servers, such as the one or more remote platforms connected to the networked environment through wireless or wired connections. According to one embodiment, remote platforms can be implemented in or function as base stations (which can also be referred to as Node Bs or evolved Node Bs (eNBs)). In certain embodiments, remote platforms can include web servers, mail servers, application servers, etc. According to certain embodiments, remote platforms can be standalone servers, networked servers, or an array of servers.

The system can include one or more processors for processing information and executing instructions or operations, including such instructions and/or operations stored on one or more non-transitory mediums. One or more processors can be any type of general or specific purpose processor. In some cases, multiple processors can be utilized according to other embodiments. In fact, the one or more processors can include one or more of general-purpose computers, special purpose computers, microprocessors, digital signal processors (DSPs), FPGAs, application-specific integrated circuits (ASICs), and processors based on a multi-core processor architecture, as examples. In some cases, the one or more processors can be remote from the one or more computing platforms. The one or more processors can perform functions associated with the operation of system which can include, for example, precoding of antenna gain/phase parameters, encoding and decoding of individual bits forming a communication message, formatting of information, and overall control of the one or more computing platforms, including processes related to management of communication resources.

The system can further include or be coupled to a memory (internal or external), which can be coupled to one or more processors, for storing information and instructions that can be executed by one or more processors, including any instructions and/or operations stored on one or more non-transitory mediums. Memory can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory can consist of any combination of random access memory (RAM), read only memory (ROM), static storage such as a magnetic or optical disk, hard disk drive (HDD), or any other type of non-transitory machine or computer readable media. The instructions stored in memory can include program instructions or computer program code that, when executed by one or more processors, enable the one or more computing platforms to perform tasks as described herein. In some embodiments, one or more computing platforms can also include or be coupled to one or more antennas for transmitting and receiving signals and/or data to and from one or more computing platforms. The one or more antennas can be configured to communicate via, for example, a plurality of radio interfaces that can be coupled to the one or more antennas. The radio interfaces can correspond to a plurality of radio access technologies including one or more of LTE, 5G, WLAN, Bluetooth, near field communication (NFC), radio frequency identifier (RFID), ultrawideband (UWB), and the like. The radio interface can include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

Figure 7:
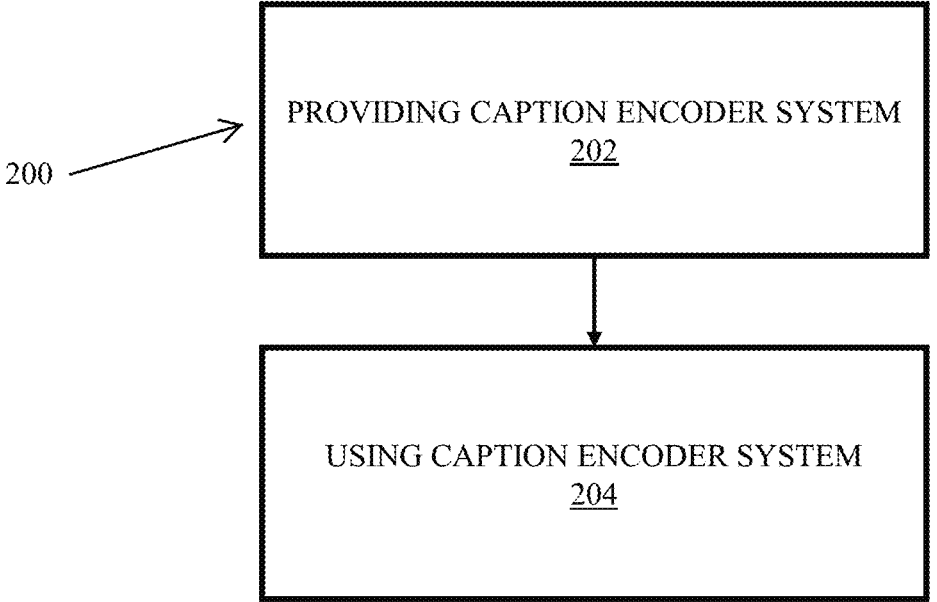
FIG. 7 is a flow diagram depicting a method of using a caption encoder system.

The present disclosure also contemplates a method 200 for using a caption encoder system 100, as shown in FIG. 7. In a step 202, the caption encoder system 100 of the present disclosure can be provided. The caption encoder system 100 can include a caption encoder card 102 and a computer system 104. The caption encoder card 102 can include an input component 106, a field programmable gate array (FPGA) 108, a microcontroller unit (MCU) 110, a peripheral component interconnect express (PCIe) Bridge 112, and a plurality of output components 114. The input component 106 can be configured to receive an input SDI stream 124. The FPGA 108 can be in communication with the input component 106 and can be configured to compile an output SDI stream 126 with embedded closed captions. The MCU 110 can be in communication with the FPGA 108. The PCIe Bridge 112 can be in communication with the MCU 110 and a plurality of universal serial bus to serial devices. The plurality of output components 114 can be communication with the FPGA 108. The caption encoder card can be operatively installed in a rack of the computer system In a step 204, the caption encoder system can transform the input SDI stream, including audio data, into the output SDI stream with embedded closed captions.

Advantageously, the caption encoder system of the present disclosure can allow for multiple caption encoder cards 102 can be integrated into a single computer system 104. Advantageously, this can allow the computer system 104 to be used across multiple broadcasts at one time, for example, a state government broadcasting meetings from multiple hearing rooms at one time. The caption encoder system 100 can allow for multiple channels to be simultaneously broadcast.

Further, the caption encoder system 100 of the present disclosure can provide a spare redundancy in the case where one of the encoders experiences a failure. The ability of the caption encoder system to broadcast multiple channels simultaneously can provide an open channel that can be utilized if another encoder fails. Should one of the encoders experience a failure, the system can be configured to divert the broadcast to an open encoder.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A peripheral component interconnect express (PCIe) caption encoder card, comprising:

an input component configured to receive an input (serial digital interface) SDI stream;

a field programmable gate array (FPGA) in communication with the input component and configured to compile an output SDI stream with embedded closed captions;

a microcontroller unit (MCU) in communication with the FPGA;

a peripheral component interconnect express (PCIe) bridge in communication with the MCU and a plurality of universal serial bus to serial devices, wherein the PCIe bridge includes an internal USB to serial port configured to transfer encoder settings and decoder settings; and a plurality of output components in communication with the FPGA, wherein each of the plurality of output components is configured to output a modified SDI stream based on user settings.

2. The PCIe caption encoder card of claim 1, wherein the input SDI stream includes audio data.

3. The PCIe caption encoder card of claim 1, wherein the input component is configured to accept 3 Gigabit/High Definition/Standard Definition-SDI transport SDI streams.

4. The PCIe caption encoder card of claim 1, wherein the PCIe caption encoder card is configured to re-clock the output SDI stream.

5. The PCIe caption encoder card of claim 1, wherein the output SDI stream includes a video stream with embedded closed captions.

6. The PCIe caption encoder card of claim 1, wherein PCIe caption encoder card is configured to decode the output SDI stream.

7. The PCIe caption encoder card of claim 1, wherein the PCIe bridge includes a plurality of internal USB to serial ports.

8. The PCIe caption encoder card of claim 1 wherein the PCIe bridge includes an internal USB to serial port configured to transfer at least one of caption data and text.

9. A caption encoder system, comprising:

a computer system; and the PCIe caption encoder card of claim 1 operatively installed in a rack of the computer system.

10. The caption encoder system of claim 9, wherein the caption encoder is configured to operate without a network connection.

11. The caption encoder system of claim 9, wherein the caption encoder system is configured to broadcast up to eight channels.

12. A method for using a caption encoder system, comprising:

providing a caption encoder system including:

a computer system and a caption encoder card including an input component configured to receive an input SDI stream, a field programmable gate array (FPGA) in communication with the input component and configured to compile an output SDI stream with embedded closed captions, a microcontroller unit (MCU) in communication with the field programmable gate array, a peripheral component interconnect express (PCIe) bridge in communication with the MCU and a plurality of universal serial bus to serial devices, wherein the PCIe bridge includes an internal USB to serial port configured to transfer encoder settings and decoder settings, and a plurality of output components in communication with the FPGA wherein each of the plurality of output components is configured to output a modified SDI stream based on user settings, the caption encoder card operatively installed in a rack of the computer system; and using the caption encoder system to transform the input SDI stream including audio data into the output SDI stream with embedded closed captions.

13. The method of claim 12, wherein the input component is configured to accept 3 Gigabit/High Definition/Standard Definition-SDI transport SDI streams.

14. The method of claim 12, wherein the caption encoder transforms the input SDI stream including audio data into the output SDI stream with embedded closed captions without a network connection.

15. A peripheral component interconnect express (PCIe) caption encoder card, comprising:

an input component configured to receive an input (serial digital interface) SDI stream;

a field programmable gate array (FPGA) in communication with the input component and configured to compile an output SDI stream with embedded closed captions;

a microcontroller unit (MCU) in communication with the FPGA;

a peripheral component interconnect express (PCIe) bridge in communication with the MCU and a plurality of universal serial bus to serial devices, wherein the PCIe bridge is configured to receive caption data in a first language at one port and to receive caption data in a second language at another port; and a plurality of output components in communication with the FPGA, wherein each of the plurality of output components is configured to output a modified SDI stream based on user settings.

16. A peripheral component interconnect express (PCIe) caption encoder card, comprising:

an input component configured to receive an input (serial digital interface) SDI stream;

a field programmable gate array (FPGA) in communication with the input component and configured to compile an output SDI stream with embedded closed captions;

a microcontroller unit (MCU) in communication with the FPGA;

a peripheral component interconnect express (PCIe) bridge in communication with the MCU and a plurality of universal serial bus to serial devices, wherein the PCIe bridge is configured to receive caption data in a first language at one port and to receive caption data in a second language at another port; and a plurality of output components in communication with the FPGA, wherein each of the plurality of output components is configured to output a modified SDI stream based on user settings, wherein the input SDI stream includes audio data, and the input component is configured to accept 3 Gigabit/High Definition/Standard Definition-SDI transport SDI streams.

17. The PCIe caption encoder card of claim 16, wherein the output SDI stream includes a video stream with embedded closed captions and the PCIe caption encoder card is configured to decode the output SDI stream.

* * * * *